US005455055A

United States Patent [19]
Stoltz

[11] Patent Number: 5,455,055
[45] Date of Patent: Oct. 3, 1995

[54] NON-AEROSOL, UNIFORM SPRAY DISPERSION SYSTEM FOR OIL-BASED PRODUCTS

[76] Inventor: Edwin I. Stoltz, 12 Willow La., Avon, Conn. 06001

[21] Appl. No.: 176,919

[22] Filed: Jan. 30, 1994

Related U.S. Application Data

[63] Continuation of Ser. No. 773,139, Oct. 8, 1991.

[51] Int. Cl.[6] ........................................ B65B 47/00
[52] U.S. Cl. .................. 426/115; 426/116; 426/609; 426/811
[58] Field of Search .......................... 426/115, 116, 426/609, 811

[56] References Cited

U.S. PATENT DOCUMENTS

| | | | |
|---|---|---|---|
| 4,057,176 | 11/1977 | Horvath | 222/193 |
| 4,142,003 | 2/1979 | Sejpal | 426/601 |
| 4,384,008 | 5/1983 | Millison | 426/613 |
| 5,229,156 | 7/1993 | Yokomizo et al. | 426/533 |

*Primary Examiner*—Anthony J. Weier
*Attorney, Agent, or Firm*—Melvin I. Stoltz

[57] ABSTRACT

By providing a liquid, vegetable oil-based formulation incorporating a particular flavoring, concentrate or blending agent and placing the formulation in a vessel on which a high pressure, non-throttling pump is attached, a unique, reliable dispensing system is achieved which repeatedly and consistently dispenses the formulation in a wide, uniformly dispersed spray. Preferably, the high pressure pump provides a delivery pressure between about 90 and 110 psig, thereby assuring that the moderate viscosity formulation is dispersed in the desired spray pattern. In addition, the formulation preferably incorporates pure grain ethyl alcohol in addition to vegetable oil and the desired blending agent, concentrate or flavoring. By employing this invention, a dispensing system is achieved, providing a dependable, repeatable, wide, uniformly dispersed spray for a wide variety of products, including non-stick cooking release sprays, salad dressing sprays, food taste or flavor enhancing sprays, cooking sprays and pet or animal food enhancing or attracting sprays.

20 Claims, No Drawings

NON-AEROSOL, UNIFORM SPRAY DISPERSION SYSTEM FOR OIL-BASED PRODUCTS

This application is a continuation of application Ser. No. 07/773,139, filed Oct. 8, 1991.

TECHNICAL FIELD

This invention relates to non-aerosol, uniform spray dispersion systems for oil based products, and more particularly, to dispersion systems for obtaining a non-aerosol, wide, uniform spray of oil based products for food-related use.

BACKGROUND ART

For many years, the use of finger actuated pumps to dispense a broad range of liquid products has become increasingly popular. These systems have been effective, particularly with products which are water based or have very low viscosity. However, as the viscosity of the product increases, the use of these pump sprays have been incapable of providing a wide, uniform, consistent spray pattern.

One of the areas where particular attention has been paid, with no effective resolution being achieved, is in food-related products. In particular, products used to coat surfaces of cooking utensils, such as for baking, frying, sauteing, etc., represent an area in which the need for a wide, uniformly dispersed spray has long existed, without any satisfactory product being achieved.

Typically, the surface of the cooking pot, pan, or other utensil is manually coated with a release agent or is sprayed with a release agent by employing either a squeeze bottle or a low pressure finger actuated pump. However, the use of these prior art spray systems result in the product being dispensed in discontinuous, non-uniform "spits" of product, or in dribbles of product. As a result, a ragged, uneven spray pattern is achieved, which has caused these products to be commercially unacceptable.

U.S. Pat. Nos. 4,142,003 and 4,163,676 typify the prior art commercially available products which have been completely unsuccessful in satisfying consumer needs. Although non-aerosol, oil-based compositions are detailed in these patents, these patents teach the use of formulations with a squeeze bottle or a non-aerosol, low-pressure, finger-actuated spray bottle. When the teaching of these patents is put into effect, a commercially unacceptable spray is obtained.

Although both of these prior art patents seek to provide a cooking and release spray which dispenses a wide, consistent, dependable, uniformly dispersed spray, the actual application of the teaching found in these prior art patents reveals a spray which is not dependable, delivers small concentrated zones of product and has a spray which spurts or dribbles from the actuator.

In addition to teaching a product which does not possess an optimal formulation for providing a uniformly dispersed spray pattern, these prior art patents also teach away from the present invention by teaching the sole use of low pressure, finger-actuated pumps. Typically, such low pressure pumps operated at delivery pressures of between about 6 and 10 psig.

In order to operate these prior art pumps, the pump must first be primed with product before the spray can be delivered. This is typically achieved by depressing the actuator several times in order to remove the air from the pump body or chamber. The depression of the actuator moves the stem downward which, in turn, depresses the unactuated piston. This causes a vacuum inside the chamber to be created which allows the product to flow into the chamber on the upstroke. Once primed, the pump is sealed and the product is dispensed with each subsequent actuation.

It has been found, however, when this low pressure finger-actuated pump is employed with the formulations detailed in these two prior art patents, a ragged, intermittent spray is achieved which is incapable of providing the desired, uniform distribution of the product in the can for its use. As a result, the prior art teaching found in these patents is incapable of providing a cooking and release distribution system which effectively meets the industry needs.

Therefore, it is a principal object of the present invention to provide a dispersion system which is capable of delivering oil-based products in a wide, consistent, uniform dispersion spray pattern.

Another object of the present invention is to provide a dispersion system for oil-based products having the characteristic features described above which is particularly suited for use in food-related areas and is particularly useful in providing a commercially acceptable non-stick cooking release spray system.

Another object of the present invention is to provide a dispersion system for oil-based products having the characteristic features described above which is capable of being formulated into a variety of alternate embodiments to attain a wide range of alternate products for delivering uniform dispersed spray patterns usable on salads, bread, popcorn, cooking, and the like.

A further object of the present invention is to provide a dispersion system having the characteristic features described above which is also capable of being formulated to provide sprayable flavor enhancing products for use with pet foods or in dispensing a food attracting odor to a desired substrate.

Other and more specific objects will in part be obvious and will in part appear hereinafter.

DETAILED DISCLOSURE

The present invention overcomes the prior art inabilities by providing a dispensing system which produces a non-aerosol wide, uniform spray of oil-based products repeatedly and dependably. It has been found that in order to attain the desired uniform spray, a particular general composition must be employed along with a specific type of pump. By combining these two elements in the manner detailed herein, a unique synergistic result is achieved.

The overall formulation for the oil-based composition of the present invention is moderately viscous and comprises a vegetable oil, pure grain ethyl alcohol and at least one selected from the group consisting of a blending agent, a food concentrate and a flavoring. The second requirement of the present invention is to disperse the oil-based composition by employing a high compression, finger-actuated pump. By employing this combination, a highly effective dispersion system is achieved which is capable of efficiently and effectively dispensing the desired oil-based, generally food-related composition in a wide, uniform spray which is consistently, dependably and repeatedly obtainable.

High compression pumps have been employed in the prior art for various products. However, these pumps have typically been used for lower viscosity compositions and water-based products. Use of these pumps for oil-based products has generally been considered inappropriate and, prior to the present invention, use of these pumps for oil-based products of the viscosity taught herein has not been considered viable.

In the present invention, a unique, food-related formulation is attained which enables a wide range of oil-based compositions with moderately high viscosity to be dispensed in a manner previously unattainable. By employing the general formulation of this invention in combination with a finger-actuated high compression pump, a spray system is achieved which provides a uniform, wide, consistent spray pattern which overcomes the prior art inabilities and failures.

In addition, the present invention provides a variety of products which are all formulated for use in food preparation, food consumption, food enhancement or food simulation. In each of these instances, the ability to attain a food related product that is capable of being dispensed in a uniform, consistent, dependable spray pattern has long been sought and has generally remained unfulfilled. As is more fully detailed below, the various food related formulations encompassed within the present invention include salad sprays, made of either all vegetable oil or various herb-based flavor enhancers, butter sprays for use on bread or popcorn, garlic flavored butter spays, cooking sprays, either plain or flavored, flavor enhancers for pet foods, and spray enhancers for use in fishing. In addition, as discussed above, one of the principal uses for the formulation of the present invention is in cooking wherein a non-stick, release spray is desired for use on cooking pans, pots, etc. It is this particular use for which substantial effort has been expended in the prior art, without any realistic success having been achieved.

In the early 1950's, lecithin was commercially used as a cooking-pan release agent. At that time, the lecithin available and used as a cooking-pan release agent had a viscosity in the range of 10,000 cps at 70° F. With more technical research having been done on lecithin through the years, relatively light liquid lecithin products have been achieved, with a viscosity in the range of 1,500–3,000 cps. In addition, these newer lecithin products have a bland odor and taste, both of which are desirable for pan release cooking spray products. Some of these new lecithin products are heat resistant, so that they do not discolor or develop a burned odor and taste when used in the cooking process. These new lower viscosity lecithin products, containing 50–62% phospholipids, enable them to be easily used for blending with either cold or warm vegetable oil.

Although the word "lecithin" is derived from the Greek word "Lekithos" which means the "yolk of an egg", the primary commercial source for lecithin is the soybean. Lecithin is a naturally occurring group of phospholipids that are found in nearly every living cell. While lecithin is used for many purposes in the food industry, the health conscious consumer looks to this natural ingredient as a source of cholesterol-free poly-unsaturated fats.

Lecithin chemically is a complex phospholipid mixture of acetone insoluble phosphatidylcholine, phosphastidylethanolamine, phosphatidylinositol and phosphatidic acid. Since lecithin has surface active properties, it has both hydrophobic (loves oil/fat) and hydrophilic (loves water) properties. Over the last 10 years or so, lecithin has been modified in many forms to either emphasize or reduce these properties.

As a result, lecithin in its many chemical compositions and forms can be used as a food emulsifier, pan release agent, viscosity modifier, wetting agent, anti-dusting agent or mix/blend aid.

Although prior art patents such as U.S. Pat. Nos. 4,142,003 and 4,163,676 disclose a combination of lecithin with ethyl alcohol, for use as a non-aerosol cooking pan release agent, it has been found that the formulations taught by these prior art patents are incapable of satisfying the consumer needs. In particular, the formulations taught in these patents, when dispensed from the squeeze or spray bottles also taught therein, have proven totally ineffective and incapable of providing a uniform, wide, repeatable and dependable spray pattern.

Although numerous attempts have been made, these prior art compositions and spray vehicles are merely capable of producing inconsistent spurts of product which either spit or dribble on the pan. These prior art systems result in spray patterns wherein the formulation is concentrated in small zones, while inconsistent and non-dependable droplets may be produced in areas outside of the small concentrated zone of product delivery. Since the consumer seeks to have a uniform, dependable, and easily employed product which produces a complete uniform distribution on the entire pan surface, these prior art constructions are incapable of satisfying the consumer needs.

In the present invention, this prior art failure has been completely eliminated and a consistent, uniform, dependable and repeatable spray pattern is achieved. By employing the general formulation detailed in Table I in combination with a finger-actuated, high pressure pump or atomizer, a completely uniform, widely dispersed, spray pattern is achieved in a repeatable and dependable delivery system. In this way, the consumer need is fully met and the prior art failure is overcome.

In the preferred embodiment, the high pressure, pre-compression pump is non-throttling. As a result, once the pump is primed, it is ready for dispensing, and any degree of finger depression of the actuator opens the pump system for its consistent spray pattern. The prior art low pressure pumps are easily throttled, which causes an irregular, stream, spurt or partial limp spray to be discharged.

TABLE I

| Ingredients | % By Weight |
| --- | --- |
| Vegetable Oil | 75–96 |
| Ethyl Alcohol (200 proof) | 3–10 |
| Blending Agent, Concentrate, or Flavoring | 1–15 |
| Antioxidant | 0–0.1 |
| Colorant | 0–.001 |

In the preferred embodiment, the vegetable oil employed in the formulation of the present invention comprises one or more vegetable oils selected from the group consisting of corn, olive, soybean, canola, peanut, and safflower. In addition, the ethyl alcohol employed in the present invention must comprise pure grain ethyl alcohol or 200 proof ethyl alcohol. By employing this high grade ethyl alcohol, the presence of water is substantially eliminated and conditions for unwanted microbial growth are avoided.

The various blending agents, food concentrates or flavorings that can be employed in the present invention are illustrated in the following examples. As will become immediately apparent from the following detailed disclosure, a wide variety of products and uses can be achieved by employing the dispersion system of this invention. Consequently, the following examples are considered to be illustrative of the present invention, and are not to be considered as limiting the scope of this invention.

If desired, an antioxidant can be incorporated into the product delivery formulation. If employed, the antioxidant must be an FDA approved food-grade type antioxidant. In the preferred embodiment, the antioxidant comprises at least one selected from the group consisting of propyl gallate, butylated hydroxyanisole, tertiary butylhydroxyquinone, and tocopherol.

Furthermore, if a particular color is desired for the product, a colorant may be added. The colorant must also be FDA approved for food products in order to be employed in the compositions of this invention. Although most food compatible colorants can be employed in the present invention two such colorants are annatto and beta-carotene. Typically, a small quantity of the colorants is required, with a range of between about 5 and 10 parts per million being sufficient.

In general, the various food-oriented formulations obtainable by employing the present invention comprises viscosity ranging between about 20 and 60 cps. In addition, due to the required presence of a vegetable oil in the composition, the food-related formulation possesses a slippery characteristic.

It has been found that in order to obtain the desired wide, consistent, dependable uniform spray pattern necessary for achieving the goals and objectives of the present invention, the finger-actuated, high pressure pump or atomizer employed in combination with the formulation of the present invention should comprise a delivery pressure of between about 90 and 110 psig. With this delivery pressure being attained, the desired uniform, consistent, widely dispersed spray pattern being sought is realized.

In Tables II and III, the preferred formulations for highly effective, commercially saleable, non-stick, cooking pan release sprays are detailed. In Table II, an unflavored release spray is provided, while Table III details a butter flavored release spray. By employing these formulations, highly effective pan release compositions are obtained which provide a wide, consistent, uniform spray pattern when combined with the high pressure, finger-actuated pump detailed above.

TABLE II

| Non-Stick Cooking Release Spray Composition | |
|---|---|
| Ingredients | % by Weight |
| Vegetable Oil | 87.1–92.8 |
| Ethyl Alcohol (200 proof) | 5–10 |
| Lecithin | 2.1–2.8 |
| Antioxidant | 0.1 |
| Colorant | qs. |

TABLE III

| Non-Stick Butter Flavored Cooking Release Spray Composition | |
|---|---|
| Ingredients | % by Weight |
| Vegetable Oil | 86.1–92.3 |
| Ethyl Alcohol (200 proof) | 5–10 |
| Lecithin | 2.1–2.8 |
| Butter Flavor | 0.5–1.0 |
| Antioxidant | 0.1 |
| Colorant | qs. |

To prove the efficacy of the present invention, non-stick cooking releasing spray compositions in accordance with the formulations detailed in Tables II and III were created using corn, olive, soybean, canola, peanut and safflower oil. In each formulation, no difference was found in the efficacy of one oil over the other. Consequently, any of these oils, as well as similar vegetable oils of this general nature, can be employed without departing from the scope of this invention.

Furthermore, the formulations detailed above were placed in a dispensing container on which a high pressure, finger-actuated pump was securely affixed. In conducting these experiments, the high pressure, finger-actuated pump employed was an AEROPUMP having a delivery pressure of 100 psig. The AEROPUMP is manufactured by Precision Valve Limited of Ontario, Canada, a subsidiary of Precision Valve Corp., Yonkers, N.Y. 10703.

In all of the tests conducted, the delivery system obtained by combining the formulations of Tables II and III with the high pressure, finger-actuated pump having a delivery pressure of 100 psig successfully produced a wide, consistent, uniformly dispersed spray pattern repeatedly and consistently throughout numerous actuations. In addition, each formulation was tested and found to be highly successful in providing an effective non-stick cooking pan release composition.

As detailed above, the viscosity of the non-stick cooking release spray composition of the present invention is of particular importance in assuring that the desired, uniform, wide, consistent spray pattern is realized. Various formulations for the non-stick release spray composition were created and the viscosity for each formulation was determined. In addition, the resulting viscosity for these formulations was compared to the viscosity of soybean oil, corn oil, canola oil, and lecithin. In Table IV the results obtained from these experiments is fully detailed.

TABLE IV

| | Sample Formulations (%/Wgt.) | | | | | | | | | |
|---|---|---|---|---|---|---|---|---|---|---|
| Ingredient | A | B | C | D | E | F | G | H | I | J |
| Soybean Oil | 100.0 | — | — | — | 97.2 | 94.0 | 92.2 | 89.2 | 86.0 | 87.2 |
| Corn Oil | — | 100.0 | — | — | — | — | — | — | — | — |
| Canola Oil | — | — | 100.0 | — | — | — | — | — | — | — |
| Lecithin | — | — | — | 100.0 | 2.8 | 6.0 | 2.8 | 2.8 | 6.0 | 2.8 |
| Ethyl Alcohol (100%) | — | — | — | — | — | — | 5.0 | 8.0 | 8.0 | 10.0 |
| Viscosity/ | 48.7 | 48.4 | 53.9 | 950.0 | 49.8 | 51.0 | 33.2 | 27.5 | 29.1 | 25.1 |

TABLE IV-continued

| | Sample Formulations (%/Wgt.) | | | | | | | | | |
|---|---|---|---|---|---|---|---|---|---|---|
| Ingredient | A | B | C | D | E | F | G | H | I | J |
| (Cps @ 70° F.) Appearance of Liquid | | | | | | | | | | |
| 0 Days | (m) | (m) | (m) | (n) | (o) | (p) | (o) | (o) | (p) | (o) |
| 7 Days | (m) | (m) | (p) | (n) | (q) | (q) | (o) | (o) | (p) | (o) |

(m) Mobile clear light yellow liquid-easy flow
(n) Viscous dark red/brown/amber liquid, slow flow
(o) Mobile clear golden colored liquid-easy flow
(p) Mobile clear very slight reddish golden color-easy flow
(q) Cloudy, slight ppt.
The viscosity detailed above were determined by employing a Brookfield Digital Viscometer, Model LVTD, using a #1 spindle at 70° F.

In each of the formulations detailed in Table IV, the soybean oil employed consisted of commercially available soybean oil, designated as 100% pure soybean oil. The lecithin used was commercially available lecithin, having a minimum of 50% phosphatide solids. The lecithin consisted of a very viscous, dark red/brown, slow flowing liquid.

The ethyl alcohol employed in each of the formulations consisted of 200 proof (100% by weight) ethyl alcohol, which contains no water. As discussed above, the inclusion of even a small degree of moisture in this system may support microbial growth, due to bacterial or fungal matter, as well as contribute to can corrosion. Consequently, the elimination of all water from the formulation is preferred.

In addition to determining the viscosity of each of the formulations detailed in Table IV, each of the formulations were observed as to their visual appearance after formulation, as well as after remaining standing for seven days. The results are provided in Table IV. As is apparent from Table IV, sample formulations D and F were the only formulations which became cloudy with a slight precipitate after standing for seven days.

In addition to the non-sticking cooking release spray composition detailed above, a variety of other compositions have been developed for food-related use employing the teaching of this invention. By employing these alternate formulations, along with a high pressure, finger-actuated pump, products previously considered unattainable are provided and dispensed with a wide, consistent, uniformly dispersed spray pattern. Such alternate products are shown in Tables V and VI wherein formulations for an unflavored cooking spray and a flavored cooking spray are provided. As is apparent from a review of Tables V and VI, both of these formulations are very similar to the non-stick cooking release spray detailed above except for the exclusion of lecithin. Without the lecithin being present, a spray formulation is achieved which can be employed in cooking, but does not possess the non-stick release properties provided by the inclusion of lecithin.

TABLE V

| Vegetable Oil Cooking Spray | |
|---|---|
| Ingredients | % By Weight |
| Vegetable Oil | 89.9–94.9 |
| Ethyl Alcohol (200 proof) | 5–10 |
| Antioxidant | 0.1 |
| Colorant | qs. |

TABLE VI

| Garlic Flavored Cooking Spray | |
|---|---|
| Ingredients | % By Weight |
| Vegetable Oil | 86.9–93.4 |
| Ethyl Alcohol (200 proof) | 5–10 |
| Garlic Flavor | 1.5–3 |
| Antioxidant | 0.1 |
| Colorant | qs. |

In Table VII, the preferred formulation for a buttery, garlic bread spray is provided. By employing this formulation, in the high pressure, finger-actuated pump detailed above in reference to Tables II and III, a highly effective flavored butter spray dispensing system is achieved which provides a wide, consistent, uniformly dispersed spray pattern used on food items, such as bread.

TABLE VII

| Buttery Garlic Bread Spray | |
|---|---|
| Ingredients | % By Weight |
| Olive Oil | 83.9–92.9 |
| Ethyl Alcohol (200 proof) | 5–10 |
| Garlic Flavor | 1.5–4.0 |
| Butter Flavor | 0.5–2.0 |
| Antioxidant | 0.1 |
| Colorant | qs. |

In the experimental tests conducted, the spray formulation detailed in Table VII was prepared and combined with the high compression, finger-actuated pump detailed above in reference to Tables II and III. When tested, a wide, uniformly dispersed spray pattern was achieved repeatedly and consistently.

This spray was used on white bread, which was easily and effectively covered by the dispersion system of this invention. The bread was then placed in a toaster oven for toasting. Within a few minutes, hot, toasted, butter-flavored garlic bread was obtained. It was also found that although any of the vegetable oils detailed above can be employed in obtaining an effective buttery garlic bread spray, the use of olive oil is preferred.

In still further embodiments of the present invention, spray formulations for use on pop corn were attained. In Table VIII, a vegetable oil based pop corn spray is detailed, while Table IX provides the preferred formulation for a buttery pop corn spray.

TABLE VIII

Popcorn Spray

| Ingredients | % By Weight |
| --- | --- |
| Vegetable Oil | 89.9–96.9 |
| Ethyl Alcohol (200 proof) | 3–10 |
| Antioxidant | 0.1 |
| Colorant | qs. |

TABLE IX

Buttery Popcorn Spray

| Ingredients | % By Weight |
| --- | --- |
| Vegetable Oil | 88.4–96.4 |
| Ethyl Alcohol (200 proof) | 3–10 |
| Butter Flavor | 0.5–1.5 |
| Antioxidant | 0.1 |
| Colorant | qs. |

By employing either of the formulations detailed in Tables VIII and IX, a highly effective, uniformly dispersed spray pattern is achieved for application to popcorn in order to enhance its flavor. In the test conducted, it was found that a wide, uniformly dispersed spray pattern was achieved, enabling the product to be quickly and easily applied to popcorn. By employing these formulations on hot, freshly popped popcorn, a substantially increased flavor and taste was imparted thereto.

In a still further embodiment of the present invention, a unique oil-based salad dressing spray was obtained. In Table X, the formulation for the herbal salad dressing spray of the present invention is detailed.

TABLE X

Herbal Salad Dressing Spray

| Ingredients | % By Weight |
| --- | --- |
| Vegetable Oil | 74.9–94.4 |
| Ethyl Alcohol (200 proof) | 3–10 |
| Herbal Concentrate | 2.5–15 |
| Antioxidant | 0.1 |
| Colorant | qs. |

In order to provide the desired, consistent, wide, uniformly dispersed spray patten of this invention, while also providing different salad dressing flavors, the herbal concentrate detailed in Table X preferably comprises an oil-based liquid. In the preferred embodiment, the herbal concentrate comprised oil-based liquid flavoring selected from the group consisting of basil, dill, lemon, black pepper, tarragon, oregano, and rosemary oils. In this way, the desired, highly effective, consistent, repeatable wide spray dispersion pattern of this invention was realized.

It has also been found that the spray dispersion system of this invention can also be employed in achieving new products which previously were not obtainable, due to the prior art inability to obtain a dispensing system achieved herein. By employing the present invention, wherein oil-based products of moderately high viscosity are dispensed in a wide, consistent, uniform spray pattern, new formulations have been achieved for use in the pet food field and sport fishing field. In Table XI, the formulation for a pet food flavor enhancer and an attractant spray is provided.

In this formulation, the flavor concentrate preferably comprises at least one oil-based liquid concentrate selected from the group consisting of beef, liver, cheese, tuna, shrimp, chicken and crab. If desired, these oil based, liquid flavor concentrates can be employed individually or in combination.

TABLE XI

Pet Food Flavor Enhancer and/or Attractant Spray

| Ingredients | % By Weight |
| --- | --- |
| Vegetable Oil | 83.9–95.9 |
| Ethyl Alcohol (200 proof) | 3–10 |
| Flavored Concentrate | 1–6 |
| Antioxidant | 0.1 |
| Colorant | qs. |

In testing the pet food flavor enhancer formulation detailed in Table XI, it was found that a highly effective, wide, consistent, uniform spray pattern was realized when the formula was dispensed employing the high compression, finger-actuated, pump detailed in association with Tables II and III. In addition, it was also found that by spraying the flavor enhancer on normally unappetizing dry pet food, pets quickly ate the flavor enhanced pet food, even though the identical food was shunned when unflavored.

In addition to employing the formulation detailed in Table XI as a pet food flavor enhancer, it has also been found that the same formulation can be employed as an attractant spray for use in fishing. Preferably, when employed for this purpose, the flavor concentrate comprises an oil-based liquid selected from the group consisting of crab, shrimp and tuna. These concentrates can be employed either individually or in combination, as well as substituted with other similar flavor concentrates which will provide the desired result.

It will thus be seen that the objects set forth above, among those made apparent from the preceding description, are efficiently attained and, since certain changes may be made in the above article without departing from the scope of the present invention, it is intended that all matter contained in the above description shall be interpreted as illustrative and not in a limiting sense.

It is also to be understood the following claims are intended to cover all of the generic and specific features of the invention herein described and all statements of the scope of the invention which, as a matter of language, might be said to fall therebetween.

Particularly, it is to be understood that in said claims, ingredients or compounds recited in the singular are intended to include compatible mixtures of such ingredients wherever the sense permits.

Having described my invention, what I claim as new and desire to secure by Letters Patent is:

1. A non-aerosol product delivery system for use in food preparation, food enhancement, or food simulation and which provides a consistent, uniform, widely dispersed spray pattern comprising A. a housing for retaining the product therein;

B. a high compression, non-throttling pump affixed to the housing in dispensing relationship with the product and comprising a. a finger actuated trigger, and b. a delivery pressure ranging between about 90 and 110 psig; and C. a product comprising a. between about 75% and 96% by weight of at least one vegetable oil, b. between about 3% and 10% by weight of pure grain ethyl alcohol, and c. between about 1% and 15% by weight of at least one selected from the group consisting of oil-based flavorings, and product blending agents;

whereby a highly efficient and effective food-oriented product delivery system is achieved which dispenses the product repeatedly and consistently in a wide, uniformly dispersed spray pattern.

2. The non-aerosol product delivery system defined in claim 1, wherein said vegetable oil is further defined as being at least one selected from the group consisting of corn oil, olive oil, soybean oil, canola oil, and safflower oil.

3. The non-aerosol product delivery system defined in claim 2, wherein said product is further defined as comprising about 0.1% by weight of an antioxidant and about 0.001% by weight of a colorant.

4. The non-aerosol product delivery system defined in claim 3, wherein said antioxidant is further defined as being at least one selected from the group consisting of propyl gallate, butylated hydroxyanisole, tertiary butylhydroxyquinone, and tocopherol.

5. The non-aerosol product delivery system defined in claim 3, wherein said colorant is further defined as being one selected from the group consisting of annatto and beta-carotene.

6. The non-aerosol product delivery system defined in claim 1, wherein said product is further defined as comprising a non-stick cooking release product and the product blending agent therein comprises between about 2.1% and 2.8% by weight of lecithin based upon the weight of the entire product.

7. The non-aerosol product delivery system defined in claim 6, wherein said product incorporates, in addition to the product blending agent, an oil-based flavoring consisting of between about 0.5% and 1% by weight of a butter flavoring, whereby a flavored, non-stick cooking release spray is obtained which is easily applied to any desired cooking surface in a consistent, repeatable, wide, uniformly dispersed spray pattern.

8. The non-aerosol product delivery system defined in claim 1, wherein said product is further defined as comprising a food flavor and taste enhancing product and the oil-based flavoring therein comprises between about 0.5% and 2% by weight of a butter flavoring whereby a highly effective butter-flavored spray composition is obtained for ease of use and application to consumable foods.

9. The non-aerosol product delivery system defined in claim 8, wherein said food flavor and taste enhancing product is further defined as comprising between about 1.5 % and 4 % by weight of an oil-based, liquid garlic flavoring based upon the entire weight of the product.

10. The non-aerosol product delivery system defined in claim 1, wherein said product is further defined as comprising a salad dressing and the oil-based flavoring comprises between about 2.5% and 15% by weight based upon the weight of the entire product of an oil-based, liquid herbal flavoring, whereby a fully sprayable salad dressing spray is obtained and easily dispensed on a salad in a wide, uniformly dispersed spray pattern.

11. The non-aerosol product delivery system defined in claim 10, wherein said oil-based liquid herbal flavoring is further defined as being at least one selected from the group consisting of basil, dill, lemon, black pepper, tarragon, oregano, and rosemary oils.

12. The non-aerosol product delivery system defined in claim 1, wherein said product is further defined as comprising a food flavor enhancing or attractant product and the oil based flavoring comprises between about 1% and 6% by weight of an oil-based liquid food flavor concentrate, whereby a food flavor enhancing or attracting spray product is realized which provides an easily usable, dependable, consistent, wide, uniformly dispersed spray pattern for easy application to pet foods, fishing bait, and hunting decoys.

13. The non-aerosol product delivery system defined in claim 12, wherein said oil-based liquid food flavor concentrate is further defined as being one or more selected from the group consisting of beef, liver, cheese, tuna, shrimp, chicken and crab.

14. A non-aerosol, non-stick cooking release product delivery system which delivers the product in a consistent, uniform, widely dispersed spray pattern, said system comprising A. a housing for retaining the product therein;

B. a high compression, non-throttling pump affixed to the housing in dispensing relationship with the product and comprising
  a. a finger actuated trigger, and
  b. a delivery pressure ranging between about 90 and 110 psig; and C. a non-stick cooking release product comprising
  a. between about 87.1% and 92.9% by weight of at least one vegetable oil selected from the group consisting of corn oil, olive oil, soybean oil, canola oil, peanut oil, and safflower oil,
  b. between about 5% and 10% by weight of pure grain ethyl alcohol,
  c. between about 2.1% and 2.8% by weight of lecithin,
  d. between about 0% and 0.1% by weight of an antioxidant being at least one selected from the group consisting of propyl gallate, butylated hydroxyanisole, tertiary butylhydroxyquinone, and tocopherol, and
  e. between about 0% and 0.001% by weight of a colorant being one selected from the group consisting of annatto and beta-carotene;

whereby a highly efficient and effective non-stick cooking release product delivery system is achieved which dispenses the product repeatedly and consistently in a wide, uniformly dispersed spray pattern.

15. The non-aerosol, non-stick cooking release product delivery system defined in claim 14, wherein said product further comprises an oil-based flavoring consisting of between about 0.5% and 1% by weight based upon the entire weight of the product of a butter flavoring, with the vegetable oil being reduced by a same amount of said butter flavoring, whereby a flavored, non-stick cooking release spray is obtained which is easily applied to any desired cooking surface in a consistent, repeatable, wide, uniformly dispersed spray pattern.

16. A non-aerosol, food flavor and taste enhancing product delivery system which delivers the product in a consistent, uniform, widely dispersed spray pattern, said system comprising A. a housing for retaining the product therein;

B. a high compression, non-throttling pump affixed to the housing in dispensing relationship with the product and comprising
  a. a finger actuated trigger, and
  b. a delivery pressure ranging between about 90 and 110 psig; and C. a food flavor and taste enhancing product comprising
  a. between about 87.9% and 96.5% by weight of at least one vegetable oil selected from the group consisting of corn oil, olive oil, soybean oil, canola oil, peanut oil, and safflower oil, b. between about 3% and 10% by weight of pure grain ethyl alcohol, c. between about 0.5% and 2% by weight of an oil-based butter flavoring;

d. between about 0% and 0.1% by weight of an antioxidant being at least one selected from the group consisting of propyl gallate, butylated hydroxyanisole, tertiary butylhydroxyquinone, and tocopherol, and e. between about 0% and 0.001% by weight of a colorant being one selected from the group consisting of annatto and beta-carotene;

whereby a highly efficient and effective food flavor and taste enhancing product delivery system is achieved which dispenses the product repeatedly and consistently in a wide, uniformly dispersed spray pattern imparting a butter taste and flavor to foods.

17. The non-aerosol product delivery system defined in claim 16, wherein said food flavor and taste enhancing product is further defined as comprising between about 1.5% and 4% by weight of an oil-based, liquid garlic flavoring, with the vegetable oil being reduced by a same amount of said liquid garlic flavoring, thereby attaining a further flavor sprayable product.

18. A non-aerosol, salad dressing product delivery system which delivers the product in a consistent, uniform, widely dispersed spray pattern, said system comprising A. a housing for retaining the product therein;

B. a high compression, non-throttling pump affixed to the housing in dispensing relationship with the product and comprising
 a. a finger actuated trigger, and
 b. a delivery pressure ranging between about 90 and 110 psig; and C. a salad dressing product comprising
 a. between about 74.9% and 94.5% by weight of at least one vegetable oil selected from the group consisting of corn oil, olive oil, soybean oil, canola oil, peanut oil, and safflower oil,
 b. between about 3% and 10% by weight of pure grain ethyl alcohol,
 c. between about 2.5% and 15% by weight of an oil-based liquid herbal flavoring being at least one selected from the group consisting of basil, dill, lemon, black pepper, tarragon, oregano, and rosemary oils,
 d. between about 0% and 0.1% by weight of an antioxidant being at least one selected from the group consisting of propyl gallate, butylated hydroxyanisole, tertiary butylhydroxyquinone, and tocopherol, and
 e. between about 0% and 0,001% by weight of a colorant being one selected from the group consisting of annatto and beta-carotene;

whereby a highly efficient and effective salad dressing product delivery system is achieved which dispenses the product repeatedly and consistently on a salad in a wide, uniformly dispersed spray pattern.

19. A non-aerosol, food flavor or attractant product delivery system which delivers the product in a consistent, uniform, widely dispersed spray pattern, said system comprising A. a housing for retaining the product therein;

B. a high compression, non-throttling pump affixed to the housing in dispensing relationship with the product and comprising
 a. a finger actuated trigger, and
 b. a delivery pressure ranging between about 90 and 110 psig; and C. a food flavor and attractant product comprising
 a. between about 83.9% and 96.0% by weight of at least one vegetable oil selected from the group consisting of corn oil, olive oil, soybean oil, canola oil, peanut oil, and safflower oil,
 b. between about 3% and 10% by weight of pure grain ethyl alcohol,
 c. between about 1% and 6% by weight of an oil-based liquid food flavor concentrate being one or more selected from the group consisting of beef, liver, cheese, tuna, shrimp, chicken and crab,
 d. between about 0% and 0.1% by weight of an antioxidant being at least one selected from the group consisting of propyl gallate, butylated hydroxyanisole, tertiary butylhydroxyquinone, and tocopherol, and
 e. between about 0% and 0,001% by weight of a colorant being one selected from the group consisting of annatto and beta-carotene;

whereby a highly efficient and effective food flavor and attractant product delivery system is achieved which dispenses the product repeatedly and consistently in a wide, uniformly dispersed spray pattern for application to pet foods, fishing bait and hunting decoys for enhancing the appeal thereof.

20. The non-aerosol product delivery system defined in claim 1, wherein said product is further defined as comprising d. a viscosity ranging between 25 and 35 centipoises.

* * * * *